United States Patent
Daly (10) Patent No.: US 7,474,316 B2
(45) Date of Patent: Jan. 6, 2009

(54) BIT-DEPTH EXTENSION OF DIGITAL DISPLAYS VIA THE USE OF MODELS OF THE IMPULSE RESPONSE OF THE VISUAL SYSTEM

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 433 days.

(21) Appl. No.: 10/921,003

(22) Filed: Aug. 17, 2004

(65) Prior Publication Data

US 2006/0038826 A1 Feb. 23, 2006

(51) Int. Cl.
G09G 5/00 (2006.01)
G09G 5/02 (2006.01)
G06T 17/00 (2006.01)
H04N 11/20 (2006.01)
H04N 5/08 (2006.01)
G03F 3/08 (2006.01)
G06K 9/00 (2006.01)
H04N 1/405 (2006.01)
G06K 15/00 (2006.01)
G06K 9/40 (2006.01)

(52) U.S. Cl. .................. 345/596; 345/589; 345/600; 345/428; 345/694; 348/445; 348/533; 348/607; 348/683; 358/518; 358/533; 358/463; 358/3.13; 382/162; 382/167; 382/266; 382/274

(58) Field of Classification Search .................. 345/605, 345/426, 428, 581, 589, 596–601, 606, 618, 345/629–630, 690, 694; 348/441, 445, 466, 348/470, 533, 557, 602, 607, 612–618, 627, 348/683; 358/1.9, 3.13, 518–520, 533–534, 358/461, 463

See application file for complete search history.

(56) References Cited

U.S. PATENT DOCUMENTS

| 3,244,808 A | 4/1966 | Roberts |
| 3,562,420 A | 2/1971 | Thompson |
| 3,739,082 A | 6/1973 | Lippel |
| 3,961,134 A | 6/1976 | Jarvis |
| 4,268,861 A | 5/1981 | Schreiber et al. |
| 4,460,924 A | 7/1984 | Lippel |
| 4,568,966 A | 2/1986 | Lippel |
| 4,652,905 A | 3/1987 | Lippel |
| 4,758,893 A | 7/1988 | Lippel |

(Continued)

FOREIGN PATENT DOCUMENTS

| EP | 0656616 A1 | 12/1994 |
| EP | 0953956 A1 | 4/1999 |
| JP | 09185707 | 7/1997 |

OTHER PUBLICATIONS

Wolf, Spatio-Chromatic Model for Colour Image Processing, Oct. 1994, Pattern Recognition—Computer Vision & Image Processing, vol. 1.*
L.G. Roberts, "Picture Coding Using Pseudo-Random Noise", IRE Trans. on Information Theory, pp. 145-154, Feb. 1962.
J. Thompson and J. Sparkes, "A Pseudo-Random Quantizer for Television Signals", Proceedings of the IEEE, V. 55 #3, pp. 353-355, 1967.

(Continued)

Primary Examiner—Wesner Sajou
(74) Attorney, Agent, or Firm—Chernoff, Vilhauer, McClung & Stenzel (57) ABSTRACT

A dithering pattern that is generated based on a spatial operation is used for a Bit-Depth Extension (BDE) technique for preventing contouring artifacts in an image displayed by a display having a bit-depth that is less than the bit-depth of the image. The dithering pattern can be based on achromatic visual model or a spatio-chromatic visual model. The dither pattern is formed by shaping a pseudo-random noise signal by an equivalent noise visual model that is based on an array of pixels. Alternatively, the array of pixels is based on an image, or a determinate array of pixels.

38 Claims, 7 Drawing Sheets

U.S. PATENT DOCUMENTS

| | | |
|---|---|---|
| 4,956,638 A | 9/1990 | Larky et al. |
| 4,965,668 A | 10/1990 | Abt et al. |
| 5,003,166 A * | 3/1991 | Girod ............... 250/201.4 |
| 5,111,310 A | 5/1992 | Parker et al. |
| 5,138,303 A | 8/1992 | Rupel |
| 5,148,273 A | 9/1992 | Lippel |
| 5,164,717 A | 11/1992 | Wells et al. |
| 5,201,030 A | 4/1993 | Carrie |
| 5,218,649 A | 6/1993 | Kundu et al. |
| 5,227,869 A | 7/1993 | Degawa |
| 5,253,045 A | 10/1993 | Lippel |
| 5,254,982 A | 10/1993 | Feigenblatt et al. |
| 5,309,526 A | 5/1994 | Pappas et al. |
| 5,311,180 A | 5/1994 | Borgen |
| 5,333,260 A | 7/1994 | Ulichney |
| 5,333,262 A | 7/1994 | Ulichney |
| 5,525,984 A | 6/1996 | Bunker |
| 5,557,429 A | 9/1996 | Hirose |
| 5,619,228 A | 4/1997 | Doherty |
| 5,619,230 A | 4/1997 | Edgar |
| 5,623,281 A | 4/1997 | Markandey et al. |
| 5,651,078 A | 7/1997 | Chan |
| 5,652,624 A | 7/1997 | Lippel |
| 5,696,601 A | 12/1997 | Metcalf |
| 5,696,602 A | 12/1997 | Cooper et al. |
| 5,712,657 A | 1/1998 | Eglit et al. |
| 5,714,974 A | 2/1998 | Liu |
| 5,726,718 A | 3/1998 | Doherty et al. |
| 5,751,379 A | 5/1998 | Clatanoff et al. |
| 5,809,178 A | 9/1998 | Anderson et al. |
| 5,920,653 A | 7/1999 | Silverstein |
| 5,969,710 A | 10/1999 | Pettitt et al. |
| 6,023,264 A * | 2/2000 | Gentile et al. ............... 345/596 |
| 6,040,876 A | 3/2000 | Pettitt et al. |
| 6,052,491 A | 4/2000 | Clatanoff et al. |
| 6,069,609 A * | 5/2000 | Ishida et al. ............... 345/596 |
| 6,084,560 A | 7/2000 | Miyamoto |
| 6,094,187 A | 7/2000 | Jones et al. |
| 6,108,122 A | 8/2000 | Ulrich et al. |
| 6,147,671 A | 11/2000 | Agarwal |
| 6,215,913 B1 | 4/2001 | Clatanoff et al. |
| 6,441,867 B1 * | 8/2002 | Daly ............... 348/607 |
| 6,476,824 B1 * | 11/2002 | Suzuki et al. ............... 345/690 |
| 6,747,758 B1 * | 6/2004 | Nishida ............... 358/1.9 |
| 6,920,247 B1 * | 7/2005 | Mayzlin et al. ............... 382/185 |
| 2002/0058871 A1 * | 5/2002 | Oravecz et al. ............... 600/437 |
| 2003/0095132 A1 * | 5/2003 | Parish et al. ............... 345/611 |
| 2003/0164961 A1 | 9/2003 | Daly |

OTHER PUBLICATIONS

R. Ulichney, "Dithering with Blue Noise", Proceedings of the IEEE, V 76, No. 1, pp. 56-79, 1988.

T. Mitsa and K. Parker, "Digital Halftoning Using a Blue Noise Mask", J. Opt. Soc. Am. A, V. 9, No. 11, pp. 45-56, Nov. 1992.

A. Humada and A.B. Watson, "Equivalent Input Noise Model for Contrast Detection and Discrimination", JOSA V. 2 #7, pp. 1133-1139, Jul. 1985.

S. Daly, "Application of a Noise-Adaptive Contrast Sensitivity Function to Image Data Compression", Optical Engineering, V. 29, pp. 977-987, Aug. 1990.

T. Pappas and D. Neuhoff, "Printer Models and Error Diffusion", IEEE Trans. on Image Processing V. 4 #1, pp. 66-80, Jan. 1995.

J. K. Ijspeert, et al., "An Improved Mathematical Description of the Foveal Visual Point Spread Function with Parameters for Age, Pupil Size, and Pigmentation", Vision Res. V 33, pp. 15-20, 1993.

* cited by examiner

BIT-DEPTH EXTENSION OF DIGITAL DISPLAYS VIA THE USE OF MODELS OF THE IMPULSE RESPONSE OF THE VISUAL SYSTEM

BACKGROUND OF THE INVENTION

1. Field of the Invention

The present invention relates to digital displays. More particularly, the present invention relates to a system and a method providing a Bit-Depth Extension (BDE) technique for preventing contouring artifacts in an image displayed by a display having a bit-depth that is less than the bit-depth of the image.

2. Description of the Related Art

Continuous tone, or contone, imagery typically has as a minimum bit depth of 24 bits, of which eight bits are allocated for each of the red (R), green (G) and blue (B) colors in a display. The term "bit depth," as used herein, means the number of bits of resolution per pixel. Lower cost displays, however, have bit-depth limitations based on the amount of Video Random Access Memory (VRAM) that is available, the characteristics of the display, and/or the digital-to-analog converters (DAC) that are used in some cathode ray tube (CRT) displays.

For example, at one time the highest gray-level resolution for typical laptop computers is typically the "thousands of colors" mode, which corresponds to a bit depth of 16 bits. The 16-bit bit depth is typically allocated as five bits for red, six bits for green and five bits for blue. In contrast, desktop-type computers or laptop computers having more VRAM typically have a bit depth of 24 bits in which eight bits are allocated for each of the red, green and blue colors. As another example, other lower quality display devices have only a 15-bit bit depth, which is allocated as five bits per color.

Contour artifacts appear in smooth gradient regions of an image displayed by a display having a bit depth that is less than the bit depth of the image. For example, a 24-bit bit-depth image that includes part of the sky will exhibit visible contour lines in the smooth gradient regions of the sky when the image is displayed on a display having a bit depth that is less than 24 bits. Techniques have been developed for reducing contour artifacts. In particular, L. G. Roberts performed some of the original work in the area of contour prevention for pulse code modulation (PCM) coded and transmitted images. See, for example, L. G. Roberts, "Picture coding using pseudo-random noise," IRE Transactions on Information Theory, pp. 145-154, February 1962. The Roberts technique, commonly referred to as the Roberts' noise modulation technique, is principally an image-compression technique based on a gray-level resolution reduction using amplitude quantization. An image having a bit depth of seven bits can be compressed using the Roberts' noise modulation technique to become an image having a bit depth of two to three bits.

Figure 1:
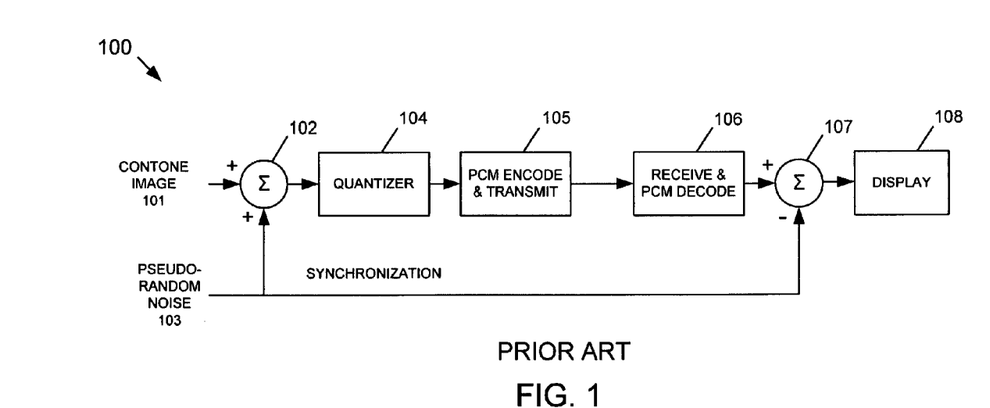
FIG. 1 depicts a functional block diagram of the general approach of a conventional Roberts' noise modulation technique.

U.S. Pat. No. 3,244,808 to Roberts discloses a conventional system utilizing the Roberts' noise modulation technique. FIG. 1 depicts a functional block diagram 100 of the general approach of a conventional Roberts' noise modulation technique. In FIG. 1, a contone image 101, which for this example has a six-bit bit depth, is combined in a summer 102 with a one-dimensional (1-D) white-noise sequence that is generated by a pseudo-random noise generator 103. The noise signal output from pseudo-random noise generator 103 has a zero mean and, consequently, prevents a tonescale shift and minimizes clipping in the output of summer 102.

The noise is added to contone image 101 during the raster scan prior to being quantized by quantizer 104, Pulse Code Modulated (PCM) encoded, and transmitted at functional block 105. The rasterization turns the added noise from a 1-D white noise to a two-dimensional (2-D) white noise. After receiver 106 receives the quantized contone image with the added noise, the image is PCM decoded. In order that the addition of the pseudo-random noise does not cause degradation of the image quality, the noise is subtracted at 107 prior to being displayed on display 108. The subtracted noise must be synchronized with the added noise so that the subtracted noise is identical and in-phase with the transmitted noise.

While the Roberts' noise modulation technique tends to break up contours that appear in a displayed image having a limited bit-depth, Roberts' noise modulation technique was largely ignored as a technique for reducing contour artifacts because the technique was developed as a compression technique and because at the time the Roberts' compression technique was developed, breaking up of contouring artifacts was an empirical observation. Interestingly, the primary distortion associated with the Roberts' noise modulation technique appears as contour artifacts that are often manifested as false edges in slowly varying gradients. It has since come to be understood that varying the orientation of elements along the contour by adding noise breaks up contouring artifacts so that the elements fall outside the association field for the Human Visual System (HVS). Other techniques of compression, such as digital pulse code modulation (DPCM) and discrete cosine transform (DCT), have enabled greater degrees of compression without contouring artifacts by primarily shifting the compression process from the spatial domain to the frequency domain.

Figure 2:
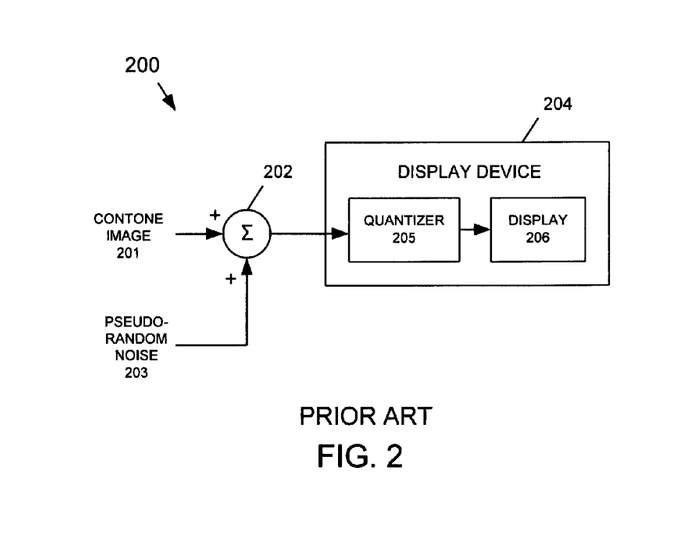
FIG. 2 depicts a functional block diagram of a system according to Lippel.

U.S. Pat. No. 3,739,082 to Lippel discloses another conventional system in which an ordered-pattern noise is added to a contone image, similar to the Roberts' compression technique, but differs in that the added noise is not removed at the receiver. FIG. 2 depicts a functional block diagram 200 of a system according to Lippel. In FIG. 2, a contone image 201 is summed at 202 with a pseudo-random noise 203 before being transmitted to a display device 204. Display device 204 includes a quantizer 205 that is needed based on the limitations and costs of the display driver for display 206. While the Lippel approach is simpler than the approach of Roberts, the overall results are not as good because subtraction of the noise has been omitted at the receiver. Nevertheless, the Lippel approach allows noise to be applied to hardcopy quantization limitations, as opposed to limitations appearing based on compression, as in Robert's noise modulation technique.

The techniques disclosed by U.S. Pat. No. 3,244,808 to Roberts and U.S. Pat. No. 3,739,082 to Lippel are commonly referred to as microdithering techniques in order to differentiate the technique from dithering techniques, which more commonly refers to halftoning techniques. A microdithering technique is based on an amplitude-dithering or a dithering-pattern addition technique, while a halftoning dithering technique is based on a spatial dither. Microdithering techniques generally can be classified into one of two categories; either as (1) a general dithering approach that adds noise, or (2) as an approach that is specifically directed to eliminating contour artifacts. (A third type of dithering, referred to as phase dithering, is used within the computer graphics field for an image is essentially continuous and must be sampled for display. Because computer graphics do not need a camera and there are no associated sensor geometry limitations, the image can be sampled in a spatially varying manner.)

The noise conventionally used for microdithering techniques is a uniform Probability-Density-Function (PDF) white noise having an amplitude that is equal to one-half of the quantization interval of the reduced quantization levels stage. The amplitude of the PDF white noise was derived from further analysis by J. Thompson et al., as disclosed in "A pseudo-random quantizer for television signals," Proceedings of the IEEE, vol. 55 no. 3, pp. 353-355, 1967. One way of looking at microdithering is that addition of a noise acts to move the quantizing intervals around from pixel to pixel, thereby breaking up contours.

Figure 3:
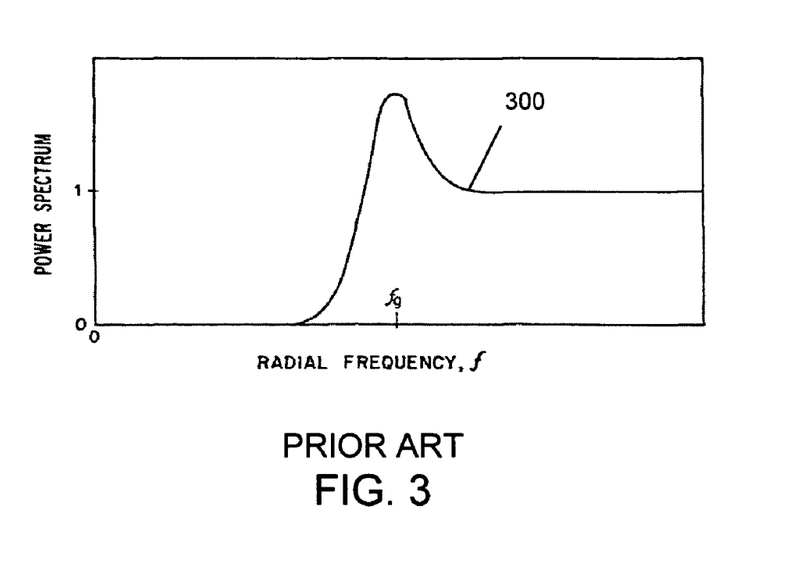
FIG. 3 depicts an exemplary spectrum of a blue noise.

Several approaches have been developed that take advantage of the low-pass filter (LPF) characteristics of the Human Visual System (HVS) and, consequently, select a pseudo-random noise having a high-pass characteristic. Any added noise appearing on the display would be attenuated by the LPF characteristics of the HVS, which is primarily based on optical properties. See, for example, R. Ulichney, "Dithering with Blue Noise," Proceedings of the IEEE, vol. 76, no. 1, pp. 56-79, 1988, and T. Mitsa et al., "Digital halftoning using a Blue Noise Mask," In SPIE Electronic Imaging Conference, V. 1452, pp. 45-56, 1991. The noises selected by Ulichney and by Mitsa et al. are based on a general understanding of the HVS and are similar to dithering noises that are used for hardcopy haftoning applications. The spectrally shaped noises used by Ulichney and Mitsa et al. are termed "blue noise" as an analogy to the term "pink noise," which is used in audio application. The color term "blue" for the noise comes from the spectral shape of the noise as a function of frequency. FIG. 3 depicts an exemplary spectrum 300 of a blue noise. Spectrum 300 generally has a shape corresponding to high frequencies and peaks at peak frequency $f_g$, hence the term "blue". Peak frequency $f_g$ depends on the gray level g (normalized to 0-1) and ranges from 0 to 0.7 cy/pixel.

Figure 4:
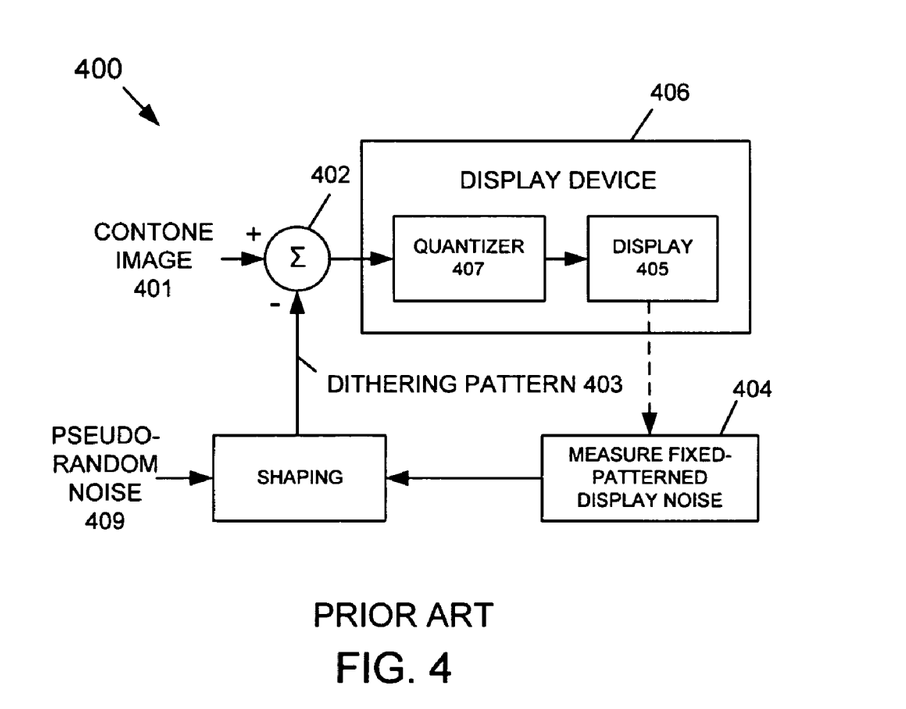
FIG. 4 depicts a functional block diagram illustrating a conventional microdithering technique that uses the inherent noise of a display.

Microdithering techniques can be conceptually extended to displays by removing the compression stage and basing the transmitter stage noise on the inherent noise of the display. Accordingly, the noise associated with the display must be known and/or can be measured based on a fixed-pattern component of the noise of displays. U.S. Pat. No. 6,441,867 B1 to Daly discloses a conventional microdithering technique that uses the inherent noise of a display and that can be classified as a general noise-additive dithering technique. FIG. 4 depicts a functional block diagram 400 illustrating one microdithering technique disclosed by Daly that uses the inherent noise of a display. In FIG. 4, a contone image 401 is summed at 402 with a dithering pattern 403 that is based on a fixed-pattern display noise 404. Fixed-pattern display noise 404 is used to shape, or filter, a pseudo-random noise 409 to create dithering pattern 403. Fixed-pattern display noise 404 is measured from a display 405 of a display device 406. A quantizer 407 is not required for compression, but is needed based on the limits and costs of the display driver for display 405. Note that the signs of the noise are reversed in contrast to FIG. 1. That is, the noise is added at display 405 (by display 405), and subtracted prior to quantizer 407, which is trivial when the noise has a zero mean. Accordingly, the pre- and post-quantization noise essentially cancel (except for any quantization error), thereby reducing contouring artifacts, particularly when going from 256 to 64 levels (i.e., a bit depth of 8 bits to a bit depth of 6 bits). Nevertheless, the inability to subtract the added noise results in an image that has visible noise.

For each of the conventional microdithering techniques depicted in FIGS. 1, 2 and 4, the goal is to add as much noise to the contone image as possible, while making sure that the added noise is not visible in the displayed image. Because the noise is not cancelled in the conventional approaches shown in FIGS. 2 and 4, the smallness of the size of the quantization levels are limited to avoid the noise being visible. That is, the quantization levels must be sufficient large to avoid the noise from becoming visible.

Figure 5:
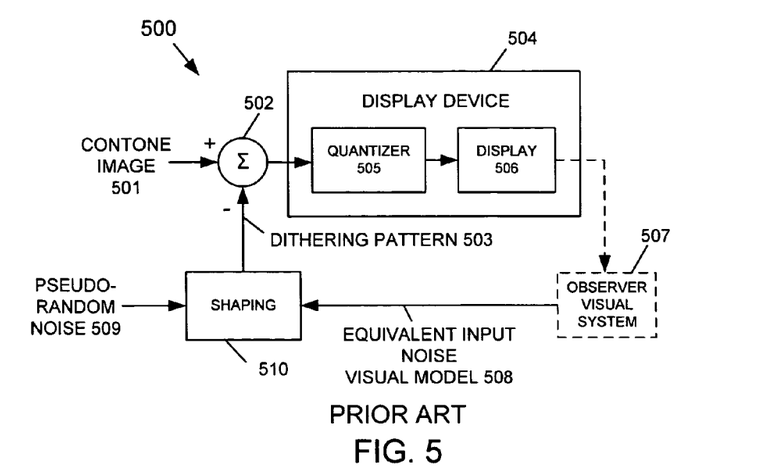
FIG. 5 depicts a functional block diagram ilustrating a conventional microdithering technique for preventing contouring artifacts in an image displayed by a display having a bit-depth that is less than the bit-depth of the image.

FIG. 5 depicts a functional block diagram 500 illustrating another microdithering technique disclosed by U.S. Pat. No. 6,441,867 B1 to Daly for preventing contouring artifacts in an image displayed by a display having a bit-depth that is less than the bit-depth of the image. According to this aspect of Daly, a dithering pattern is used that is based a visual model of the equivalent input noise of the HVS instead of a dithering pattern that is based on the noise of the display. The equivalent input noise of the HVS is generated based on the frequency response of the HVS, which is measured by an observer visual system 507 and modeled as an Equivalent Input Noise Visual Model 508. Because the CSF can be modeled as anisotropic in 2-D, the noise also has anisotropic statistics. Thus, a frequency-domain technique is used to model the noise. Equivalent Input Noise Visual Model 508 is used at 510 to shape, or filter, pseudo-random noise 509 to create dithering pattern 503. A contone image 501 is combined by a summer 502 with dithering pattern 503 before being input to a display device 504. Display device 504 includes a quantizer 505 that is required based on the limitations and costs of the display driver for display 506.

The approach used by Daly in FIG. 5 is similar to a characterization of an electronic component by referring the internal noise of the component to its equivalent effect as if the noise was an input noise. That is, the internal noise of the component is described in units of the input. While a visual noise may exist in units of millivolts of a neuronal cell charge, once the visual noise has been referred to as an input noise, the noise is in units of contrast (e.g., RMS contrast). The equivalent input noise of the HVS is often modeled as the inverse of the frequency response of the HVS, termed the Contrast Sensitivity Function (CSF).

While FIG. 5 depicts dithering pattern 503 being added to contone image 501, dithering pattern 503 could alternatively be used to multiply contone image 501 depending on how the nonlinear domain of the code values of the image are represented. That is, adding in a log scale is equivalent to a multiplication in a linear scale. Adding in a gamma-corrected domain is a rough approximation to either log or linear addition.

Figure 6:
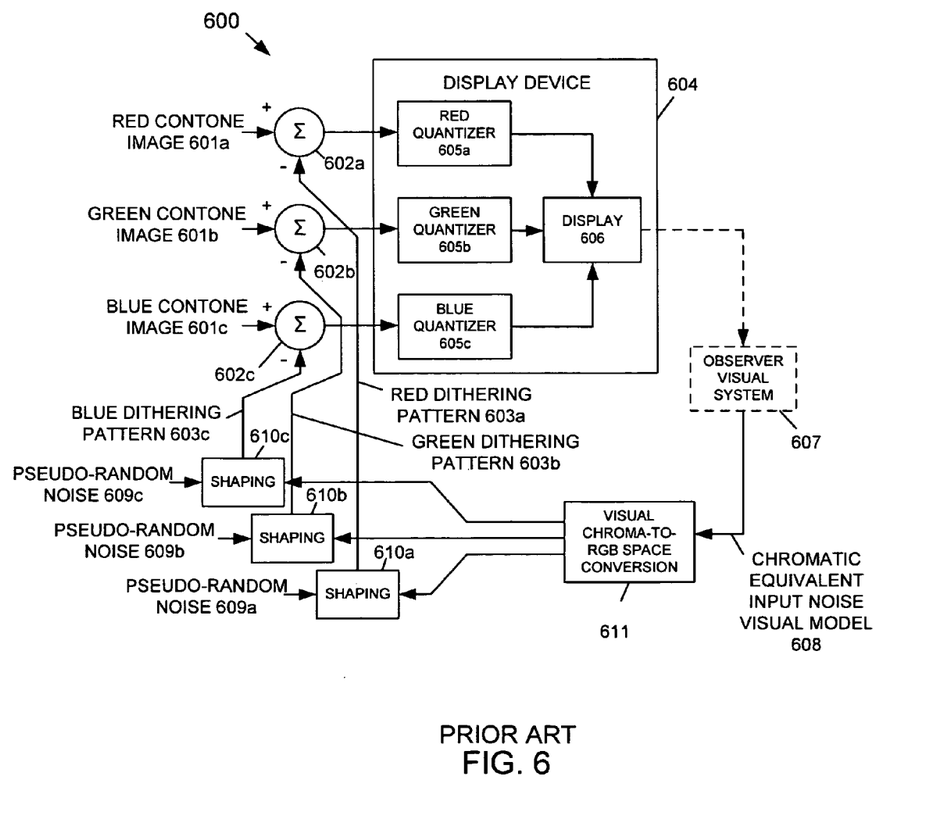
FIG. 6 depicts a functional block diagram illustrating a microdithering technique. for preventing contouring artifacts in a color image displayed by a display having a bit-depth that is less than the bit-depth of the image.

FIG. 6 depicts a functional block diagram 600 illustrating a microdithering technique disclosed by U.S. Pat. No. 6,441,867 B1 to Daly for preventing contouring artifacts in a color image displayed by a display having a bit-depth that is less than the bit-depth of the image. According to this aspect of Daly, a Chromatic Equivalent Noise Model 608 is generated from the observer visual system 607. Chromatic Equivalent Noise Model 608 converted to the RGB space by a Visual Chroma-to-RGB Space Converter 611 for separation into an equivalent noise model for each color image plane. Each respective equivalent noise model is used at 610a-610c to shape a pseudo-random noise 609a-609c to generate dithering patterns 603a-603c. A dithering pattern 603a-603c for each color image plane is then added to the corresponding color plane of the contone image 601a-601c by summers 602a-602c, respectively. Display device 604 includes quantizers 605a-605c that are required based on the limitations and costs of the display driver for display 606.

Spatial dithering techniques used for preventing contouring artifacts typically reduce the spatial resolution of the image. Consequently, what is needed is a technique for eliminating or reducing the contouring artifacts that is computationally simple and does not reduce the spatial resolution of the image.

SUMMARY OF THE INVENTION

The present invention provides a technique for eliminating or reducing the contouring artifacts that is computationally simple and does not reduce the spatial resolution of the image.

The advantages of the present invention are provided by a system having a dithering pattern generator and a combiner. The dithering pattern generator generates dithering pattern for each image plane of a contone image based on a spatial operation. According to one embodiment of the present invention, the dithering pattern generator generates the dithering pattern based on an achromatic visual model. According to another embodiment, the dithering pattern is based on a spatio-chromatic visual model. The combiner combines the dithering pattern with the contone image to prevent contouring artifacts in the contone image having a first bit depth when the contone image is displayed by a display having a second bit-depth such that the first bit depth is greater than the second bit-depth. The dithering pattern generator generates a dithering pattern that is based on a predetermined array of pixels. Alternatively, the predetermined array of pixels could be based on an image, or a determinate array of pixels. When the dithering pattern is based on a spatio-chromatic visual model and is also intended to be isoluminant, the dithering pattern generator generates a dithering pattern for one image plane of a contone image that is based on a predetermined array of pixels in which the amplitude of substantially all pixels in the predetermined array of pixels is set to zero. It is also possible to generate a dithering pattern based on a spatio-chromatic visual model in which three image planes are non-zero. In this case, the amplitudes and bandwidths of the dithering pattern differ across the image planes.

The dithering pattern generator further includes a lowpass filter and a complementer. The lowpass filter lowpass filters the predetermined array of pixels based on a predetermined visual system impulse response, while the complementer generates a high-pass complement of the low-pass-filtered predetermined array of pixels. Alternatively, the lowpass filter convolves the predetermined array of pixels with a predetermined inverse visual system impulse response.

The predetermined visual system impulse response can be based on, for example, the Human Visual System (HVS), a point spread function (psf) for the optics of an eye, a convolution of the point spread function for the optics of an eye with a cone sampling aperture, and/or a neural point spread function of an eye.

In one embodiment of the present invention, the contone image is displayed on a Liquid Crystal Display. In another embodiment of the present invention, the system is part of a Liquid Crystal Display. In still another embodiment of the present invention, the first bit depth per pixel is eight bits and the second bit depth per pixel is between four and six bits, inclusive. In a further embodiment of the present invention, the first bit depth per pixel is at least ten bits and the second bit depth per pixel is eight bits.

The present invention also provides a method for microdithering a contone image in which a dithering pattern for each image plane of a contone image is generated based on a spatial operation. According to one embodiment of the present invention, the dithering pattern generator is based on an achromatic visual model. According to another embodiment, the dithering pattern is based on a spatio-chromatic visual model. The dithering pattern is combined with the contone image to prevent contouring artifacts in the contone image having a first bit depth when the contone image is displayed by a display having a second bit-depth, the first bit depth being greater than the second bit-depth.

Generating the dithering pattern includes generating the dithering pattern based on a random array of pixels (i.e., noise). Alternatively, the predetermined array of pixels could be based on an image. When the dithering pattern is based on an isoluminant spatio-chromatic visual model, generating the dithering pattern generates a dithering pattern for one image plane of a contone image that is based on a predetermined array of pixels in which the amplitude of substantially all pixels in the predetermined array of pixels is set to zero. Alternatively, generating the dithering pattern generates a dithering pattern that is not isoluminant, but amplitude and bandwidths vary across the image plane.

The method further includes lowpass filtering the predetermined array of pixels based on a predetermined visual system impulse response and generating a high-pass complement of the low-pass-filtered predetermined array of pixels. In one embodiment, lowpass filtering convolves the predetermined array of pixels with the predetermined visual system impulse response.

The predetermined visual system impulse response can be based on, for example, the Human Visual System, a point spread function for the optics of an eye, a convolution of the point spread function for the optics of an eye with a cone sampling aperture, and/or a neural point spread function of an eye.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE PRESENT INVENTION

The present invention provides a Bit-Depth Extension (BDE) technique that uses a dithering pattern that is generated entirely using spatial operations, that is, without using frequency-transform techniques. Accordingly, the BDE technique of the present invention prevents contouring artifacts from appearing in an image that is displayed by a display having a bit-depth that is less than the bit-depth of the image. In one exemplary embodiment, the dithering pattern is generated based on an achromatic visual model. In another exemplary embodiment, the dithering pattern is generated based on a spatio-chromatic visual model.

The present invention is primarily intended for use with Liquid Crystal Display (LCD) or similar type displays having a digital bit-depth bottleneck, such as graphics controller cards having limited video RAM (VRAM). Bit-depth limitations can also arise in an LCD display itself, or the internal hardware driver of an LCD display. Accordingly, the present invention enables displays having a bit depth of four to six bits per color to display images that having a bit depth of at least eight bits per color. In that regard, the present invention also enables a display having an eight-bit bit depth appear to have a ten-bit bit depth quality when a ten-bit or greater bit-depth image is displayed.

Figure 7:
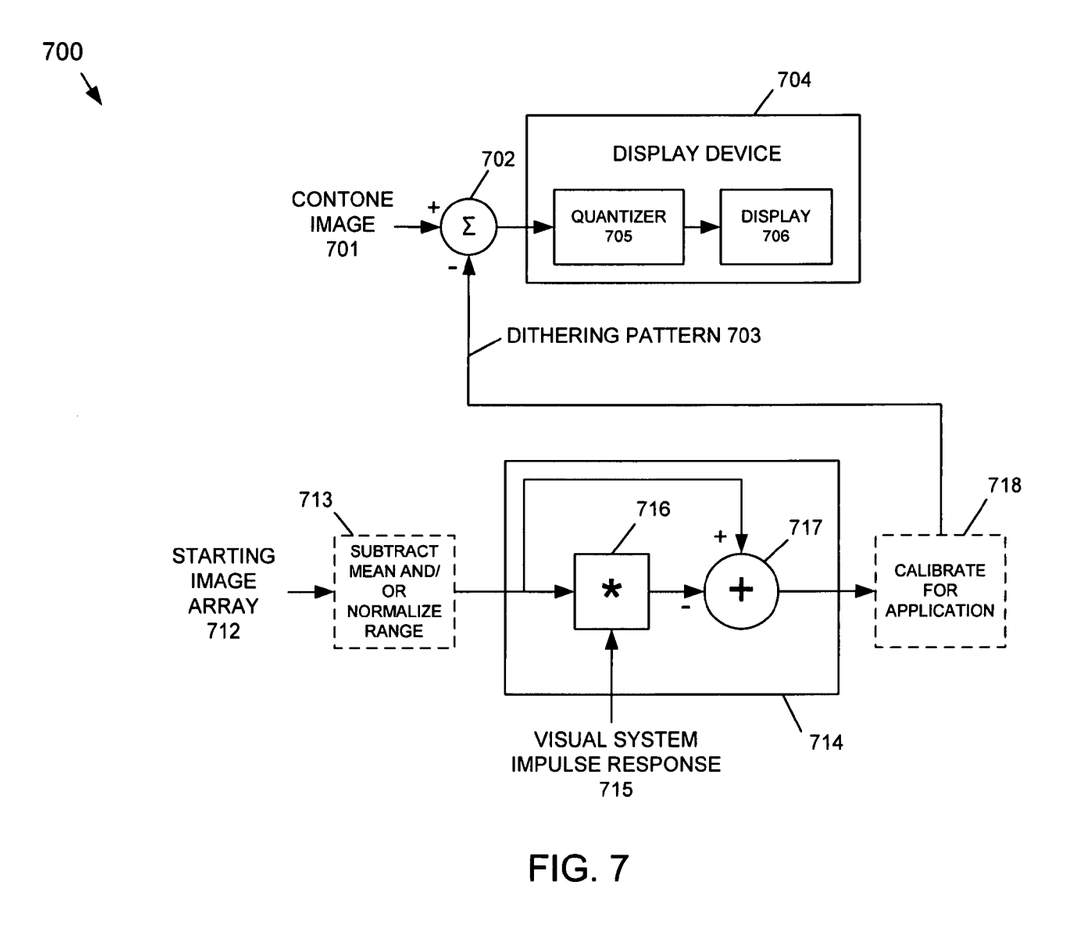
FIG. 7 depicts a functional block diagram of an exemplary embodiment of a system according to the present invention for preventing contouring artifacts in an image displayed by a display having a bit-depth that is less than the bit-depth of the image.

FIG. 7 depicts a functional block diagram of an exemplary embodiment of a system 700 according to the present invention for preventing contouring artifacts in an image displayed by a display having a bit-depth that is less than the bit-depth of the image. Portions of the topology of system 700 are similar to portions of the topology of system 500, shown in FIG. 5. A difference between one embodiment of system 700 and system 500 is that in system 700, all of the steps required for generating the dithering pattern are spatial operations, i.e., convolutions. In system 500, Fourier transform multiplication is used for generating a dithering pattern. An alternative embodiment of system 700 uses dithering-pattern that is based on a point spread function (psf) model.

In FIG. 7, a dithering pattern 703 is created by starting with a Starting Image Array (SIA) 712. SIA 712 is a 2-D array of pixels in which the pixels are generally white noise. As another alternative, an SIA could be based on an existing image, such as a texture, as long as the existing image is pre-whitened and as long as the eye cannot substantially see the dithering pattern that is created based on the SIA.

Depending on system processing requirements, the mean of the pixels of SIA 712 could be optionally subtracted from each pixel and/or the resulting range of the pixels could be optionally normalized at functional block 713, which is shown using dashed lines to indicate the optional nature of the processing. Alternatively, the pixels of the SIA 712 could be optionally normalized at functional block 713 without the mean of the pixels of the array being subtracted-from the array.

After optionally subtracting the mean and normalizing at 713, SIA 712 is shaped at 714 by convolving SIA 712 with an impulse response of the HVS 715 (or receptive field) at a 2-D convolver 716. Impulse response 715 is mapped from spatial units of degrees to pixels using Eq. (1) in which the key parameter D is the viewing distance. Conversion from the visual domain (degrees) to the display domain (pixels) is given by, $$\text{pixel} = \left(\frac{\pi D}{180}\right)\varphi \quad (1)$$

in which $\varphi$ is spatial extent in degrees, D is the viewing distance in display units, and pixel is the display unit. The display unit that is used can be any physical unit, such as inches or mm, in addition to abstract units, such as pixels. The same unit of measurement must, though, be used for the viewing distance and the distance portion of the frequency unit. Viewing distance parameter D acts to scale the CSF along the frequency axis, which is manifested as a shift when the frequency is plotted in log units. In the spatial domain, this acts to affect the degree of correlation of neighboring pixels.

The impulse response of the HVS 715 could be approximated as being Gaussian with, for example, $\sigma=0.3$ pixels for a 1024 pixel viewing distance. Alternatively, impulse response 715 could be obtained from optical studies. For example, the point spread function (psf) for the optics of an eye could alone be used for impulse response 715. Alternatively, a more sophisticated model for impulse response 715 could be obtained by convolving the PSF of the optics of an eye with a cone sampling aperture. It is also possible to use a neural PSF of an eye as a basis for impulse response 715, but care must be taken to avoid having an impulse response having a bandpass response that could lead to visible noise appearing in the displayed image.

Equation (2) is an exemplary equation that could be used for impulse response 715, and is disclosed by J. K. Ijspeert et al. in "An improved mathematical description of the foveal visual point spread function with parameters for age, pupil size, and pigmentation", Vies. Res. V. 33, pp. 15-20, 1993.

$$PSF(\phi) = \frac{1}{1+AF/7} \cdot \left\{ \frac{11.6 \cdot 10^6}{[1+(\phi/0.0044)^2]^{3/2}} + \frac{84 \cdot 10^3}{[1+(\phi/0.06)^2]^{3/2}} \right\} + \frac{1}{1+AF/7} \cdot \left\{ \frac{1.8}{[1+AF^2+(\phi/6)^2]^{3/2}} + 0.13 \right\}, \quad (2)$$

in which AF is an age-factor defined as $AF=1+(age/70)^4$ and $\phi$ is the spatial position in visual degrees.

Dithering pattern 703 should not be visible in the displayed image. Consequently, SIA 712 is subtracted from the output of 2-D convolver 716 at summer 717 to generate the complement of a lowpass-filtered SIA 712, which is dithering pattern 703. The output of summer 717 can be optionally calibrated at 718 based on the requirements of the application displaying contone image 701.

In FIG. 7, a contone image 701 is combined in a summer 702 with dithering pattern 703 before being input to a display device 704. Display device 704 includes a quantizer 705 that is needed based on the limitations and costs of the display driver for display 706.

System 700, shown in FIG. 7, generates a single-image dithering pattern 703 based on an achromatic visual model. The single-image dithering pattern is added to a single plane of an image that is to be displayed on display 706. When the image is a color display, the single-image dithering pattern generated by system 700 could be used for all three display primary channels. Alternatively, three independent SIAs could be used, with one SIA being used for each of the primary channels. When the dithering patterns are based on noises, the noises could be three noise images that have been generated using different seed values. When a deterministic dithering pattern, i.e., a non-random pattern, is used, three SIAs that are ideally independent would be used. As another alternative, different impulse responses could be used for generating the respective dithering patterns. For example, one impulse response would be used for the luminance channel, one for the red/green opponent channel, and one for the blue/yellow opponent color channel. As still another alternative, the impulse responses could be designed strictly around the optics of the eye, taking into account chromatic aberration for the R, G and B layers.

Figure 8:
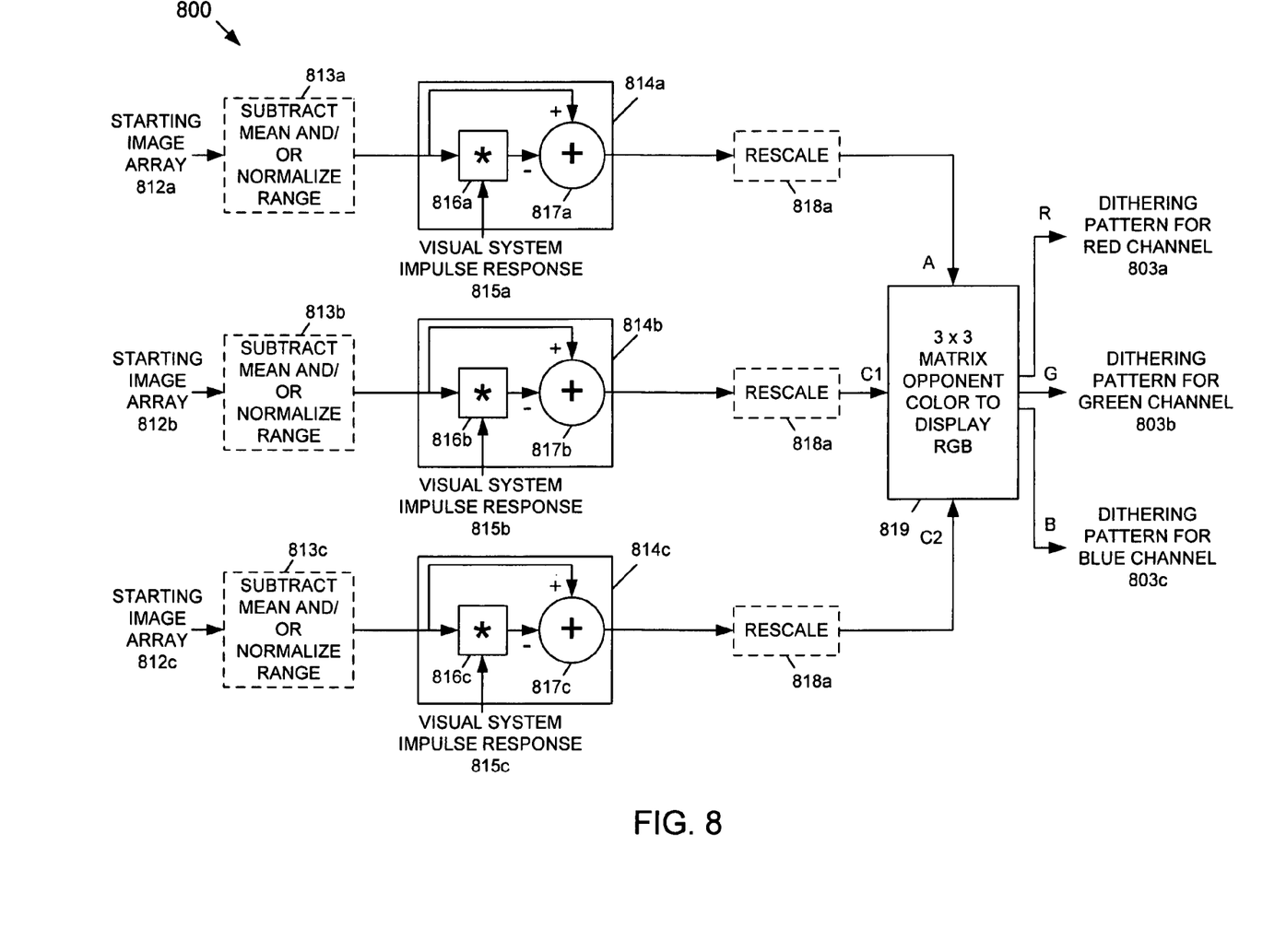
FIG. 8 shows a functional block diagram of an exemplary embodiment of a system according to the present invention for preventing contouring artifacts in a color image displayed by a color display having a bit-depth that is less than the bit-depth of the image.

FIG. 8 shows a functional block diagram of an exemplary embodiment of a system 800 according to the present invention for preventing contouring artifacts in a color image displayed by a color display having a bit-depth that is less than the bit-depth of the image. While FIG. 8 depicts three separate SIAs 812a-812c being used, one for each of the R, G and B image planes, only the processing of SIA 812a to generate a dithering pattern for the R image plane will be described. SIA 812a is selected in a manner similar to that described in connection with SIA 712. After optionally subtracting the mean and/or normalizing at 813a, SIA 812a is shaped at 814a by convolving SIA 812a with an impulse response 815a of the HVS at a 2-D convolver 816a. A high-pass version of SIA 812a is generated by subtracting the output of convolver 816a from SIA 812a at summer 817a. The output of summer 817a can be optionally scaled at 818a based on the processing requirements of the application displaying the color image.

Each of the three outputs of summers 817a-817c are converted to the R, G, and B image planes by a 3×3 Opponent Color to Display RGB Matrix 819 to form dithering patterns 803a-803c, which are used for the respective image planes.

Figure 9:
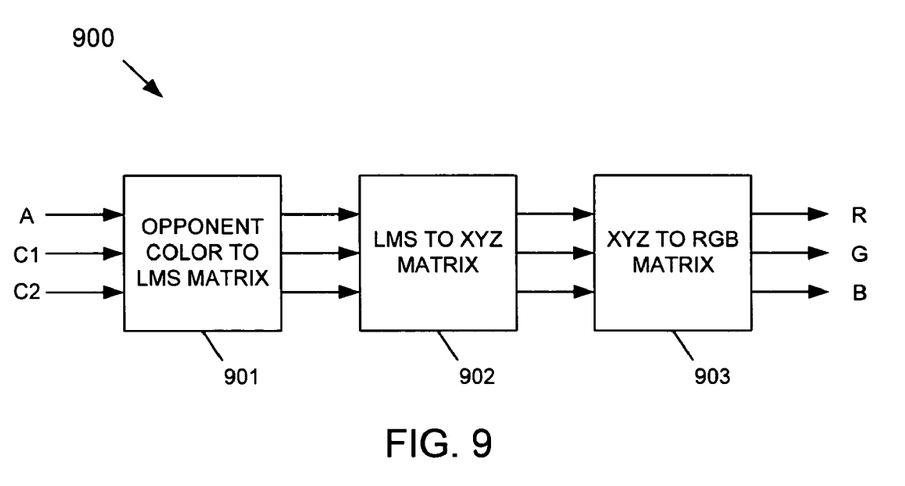
FIG. 9 depicts a block diagram of matrix multiples forming 3×3 an Opponent Color to Display RGB Matrix.

FIG. 9 depicts a block diagram 900 of matrix multiples forming 3×3 Opponent Color to Display RGB Matrix 818. Conversion 901 from opponent color space to an LMS cone space (Long, Middle, Short wavelength cones) is performed using well-known equations derived from many psychophysical experiments. Conversion 902 from LMS to XYZ is also well known. Finally, conversion 903 from XYZ to display primaries RGB depends on the actual characteristics of the display. For LCDs, conversion from XYZ to display primaries RGB is affected by combination of color filters that are placed over the pixels as well as the color spectrum of the backlight. Basically, the XYZ values of the RGB primaries are measured, and the matrix is then inverted. The 3×3 matrix values for conversion 903 could be directly measured. Alternatively, the matrix values for conversion 903 could be approximated based on characteristics of other LCDs. As yet another alternative, the matrix values could be determined based on assuming that the primaries adhere to one of the standard sets of primaries, such as a standard color space sRGB for CRTs.

Figure 10:
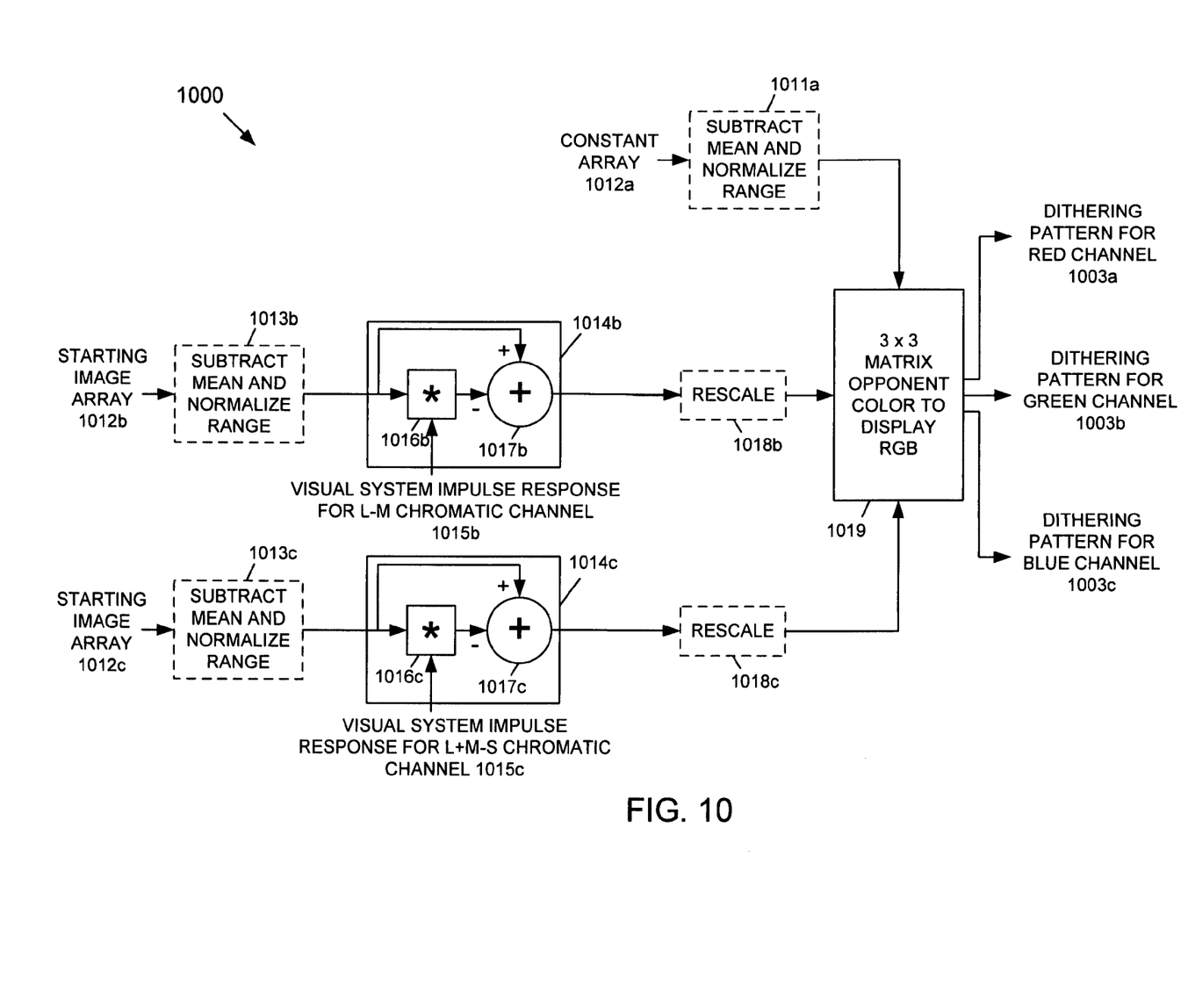
FIG. 10 shows a functional block diagram of an exemplary embodiment of another system according to the present invention for preventing contouring artifacts in a color image displayed by a color display having a bit-depth that is less than the bit-depth of the image.

FIG. 10 shows a functional block diagram of an exemplary embodiment of another system 1000 according to the present invention for preventing contouring artifacts in a color image displayed by a color display having a bit-depth that is less than the bit-depth of the image. Instead of using a chromatic noise that balances the luminance and two opponent color components, the luminance portion of a dithering pattern is set to zero in system 1000, thereby resulting in an isoluminant dithering pattern. That is, SIA 1012a is set to be a constant-amplitude pixel array in which the amplitude of substantially all pixels is set to zero because calibration of the primaries affecting block 903 (FIG. 9) is not always done, or in order to compensate for when the display does not behave as expected due to various nonlinearities. Thus, system 1000 avoids using a luminance noise, or dithering pattern, to which the HVS is more sensitive to the opponent colors.

System 1000 also includes processing for two more SIAs, SIAs 1012b and 1012c. Only the processing of SIA 1012b will be described. SIA 1012b is selected in a manner similar to that described in connection with SIA 712. After optionally subtracting the mean and/or normalizing at 1013b, SIA 1012b is shaped at 1014b by convolving SIA 1012b with an impulse response 1015b of the HVS at a 2-D convolver 1016b. A high-pass version of SIA 1012b is generated by subtracting the output of convolver 1016b from SIA 1012b at summer 1017b. The output of summer 1017b can be optionally scaled at 1018b based on the processing requirements of the application displaying the color image.

Constant array 1012a and the two respective outputs of summers 1017b and 1017c are converted to the R, G, B image planes by a 3×3 Opponent Color to Display RGB Matrix 1019 to form dithering patterns 1003a-1003c for the respective image planes.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system, comprising:
   (a) a dithering pattern generator generating a dithering pattern in a spatial domain by applying a spatial operation to a two-dimensional starting image array of pixels so as to modify the luminance of at least one pixel within said starting array;
   (b) a combiner combining the dithering pattern with a contone image, without conversion to a spatial frequency domain, so as to prevent contouring artifacts in the contone image having a first bit depth per pixel when the contone image is displayed by a display having a second bit-depth per pixel, the first bit depth being greater than the second bit-depth; and
   (c) an illuminated display displaying the combined said dithering pattern and said contone image.

2. The system according to claim 1, wherein said starting image array of pixels is an array of white noise.

3. The system according to claim 1, wherein said starting image array of pixels is based on an image.

4. The system according to claim 1, wherein said spatial operation convolves said starting image array of pixels with the impulse response of the human visual system.

5. The system according to claim 2, wherein said spatial operation convolves said starting image array of pixels with the impulse response of the human visual system.

6. The system according to claim 3, wherein said spatial operation convolves said starting image array of pixels with the impulse response of the Human Visual System.

7. The system according to claim 4, wherein said impulse response is approximately Gaussian.

8. The system according to claim 4, wherein said impulse response is based on a point spread function for the optics of an eye.

9. The system according to claim 4, wherein said impulse response is based on a convolution of the point spread function for the optics of an eye with a cone sampling aperture.

10. The system according to claim 4, wherein said impulse response is based on a neural point spread function of an eye.

11. The system according to claim 1, wherein the dithering pattern generator generates the dithering pattern based on a spatio-chromatic visual model.

12. The system according to claim 11, wherein the dithering pattern is for a color display,
   wherein the system further comprises a calibrator calibrating the dithering pattern to primaries of the color display based on an XYZ-to-RGB matrix conversion, and
   wherein X, Y and Z values of RGB primaries are used in the matrix.

13. The system according to claim 11, wherein the dithering pattern generator generates a dithering pattern for each image plane of the contone image.

14. The system according to claim 11, wherein the dithering pattern generator generates a dithering pattern for one image plane of a contone image by setting an amplitude of substantially all pixels in said starting image array to zero.

15. The system according to claim 11, wherein the dithering pattern generator generates an isoluminant dithering pattern.

16. The system according to claim 1, wherein the contone image is displayed on a Liquid Crystal Display.

17. The system according to claim 1, wherein the system is part of a Liquid Crystal Display.

18. The system according to claim 1, wherein the first bit depth per pixel is eight bits and the second bit depth per pixel is between four and six bits, inclusive.

19. The system according to claim 1, wherein the first bit depth per pixel is at least ten bits and the second bit depth per pixel is eight bits.

20. A method for microdithering a contone image, the method comprising:
(a) generating a dithering pattern by applying a spatial operation in a spatial domain to a two-dimensional starting image array of pixels so as to modify the luminance of at least one pixel within said starting image array;
(b) combining the dithering pattern with a contone image, without conversion to a spatial frequency domain, so as to prevent contouring artifacts in the contone image having a first bit depth per pixel when the contone image is displayed by a display having a second bit-depth per pixel, the first bit depth being greater than the second bit-depth; and
(c) displaying the combined said dithering pattern and said contone image on an illuminated display.

21. The method according to claim 20, wherein said starting image array of pixels is an array of white noise.

22. The method according to claim 20, wherein said starting image array of pixels is based on an image.

23. The method according to claim 20, wherein the predetermined array of pixels is a determinate array of pixels.

24. The method according to claim 20, wherein said spatial operation convolves said starting image array of pixels with the impulse response of the human visual system.

25. The method according to claim 21, wherein said spatial operation convolves said starting image array of pixels with the impulse response of the human visual system.

26. The method according to claim 22, wherein said spatial operation convolves said starting image array of pixels with the impulse response of the Human Visual System.

27. The method according to claim 24, wherein said impulse response is approximately Gaussian.

28. The method according to claim 24, wherein said impulse response is based on a point spread function for the optics of an eye.

29. The method according to claim 24, wherein said impulse response is based on a convolution of the point spread function for the optics of an eye with a cone sampling aperture.

30. The method according to claim 24, wherein said impulse response is based on a neural point spread function of an eye.

31. The method according to claim 20, wherein generating the dithering pattern generates the dithering pattern based on a spatio-chromatic visual model.

32. The method according to claim 31, wherein the dithering pattern is for a color display,
the method further comprising calibrating the dithering pattern to primaries of the color display based on an XYZ-to-RGB matrix conversion,
wherein X, Y and Z values of RGB primaries are used in the matrix.

33. The method according to claim 31, wherein generating the dithering pattern generates a dithering pattern for each image plane of the contone image.

34. The method according to claim 31, wherein the dithering pattern is generated for one image plane of a contone image by setting an amplitude of substantially all pixels in said two-dimensional starting image array to zero.

35. The method according to claim 31, wherein generating the dithering pattern generates an isoluminant dithering pattern.

36. The method according to claim 20, further comprising displaying the contone image on a Liquid Crystal Display.

37. The method according to claim 20, wherein the first bit depth per pixel is eight bits and the second bit depth per pixel is between four and six bits, inclusive.

38. The method according to claim 20, wherein the first bit depth per pixel is at least ten bits and the second bit depth per pixel is eight bits.

* * * * *